US00RE38311E

(19) United States
(12) Reissued Patent
Wheeler

(10) Patent Number: US RE38,311 E
(45) Date of Reissued Patent: Nov. 11, 2003

(54) HIGH-DENSITY CABLE DISTRIBUTION FRAME

(75) Inventor: Todd A. Wheeler, Savage, MN (US)

(73) Assignee: ADC Telecommunications, Inc., Eden Prairie, MN (US)

(21) Appl. No.: 09/035,377

(22) Filed: Mar. 5, 1998

Related U.S. Patent Documents

Reissue of:
(64) Patent No.: 5,497,444
Issued: Mar. 5, 1996
Appl. No.: 08/446,428
Filed: May 22, 1995

U.S. Applications:

(63) Continuation of application No. 08/180,970, filed on Jan. 21, 1994, now abandoned.

(51) Int. Cl.[7] ..... G02B 6/44
(52) U.S. Cl. ..... 385/135; 385/134; 385/59; 385/25
(58) Field of Search ..... 385/135–137, 385/139, 53, 59, 25, 89

(56) References Cited

U.S. PATENT DOCUMENTS

| | | | | | |
|---|---|---|---|---|---|
| 4,359,262 | A | | 11/1982 | Dolan | |
| 4,502,754 | A | | 3/1985 | Kawa | |
| 4,585,303 | A | | 4/1986 | Pinsard et al. | |
| 4,595,255 | A | | 6/1986 | Bhatt et al. | |
| 4,630,886 | A | | 12/1986 | Lauriello et al. | |
| 4,699,455 | A | * | 10/1987 | Erbe et al. | 385/89 |
| 4,717,231 | A | | 1/1988 | Dewez et al. | |
| 4,765,710 | A | | 8/1988 | Burmeister et al. | |
| 4,792,203 | A | | 12/1988 | Nelson et al. | |
| 4,986,762 | A | * | 1/1991 | Keith | 385/76 X |
| 4,995,688 | A | * | 2/1991 | Anton et al. | 385/53 |
| 5,100,221 | A | | 3/1992 | Carney et al. | |
| 5,129,030 | A | * | 7/1992 | Petrunia | 385/135 |
| 5,142,606 | A | | 8/1992 | Carney et al. | |
| 5,167,001 | A | * | 11/1992 | Debortoli et al. | 385/135 |
| 5,289,558 | A | * | 2/1994 | Teichler | 385/135 |
| 5,335,349 | A | * | 8/1994 | Kutsch et al. | 385/137 X |
| 5,353,367 | A | | 10/1994 | Czosnowski et al. | |
| 5,363,467 | A | * | 11/1994 | Keith | 385/135 |
| 5,402,515 | A | | 3/1995 | Vidacovich et al. | |
| 5,490,229 | A | | 2/1996 | Ghandeharizadeh et al. | |
| 5,511,144 | A | * | 4/1996 | Hawkins et al. | 385/135 |
| 5,570,450 | A | | 10/1996 | Fernandez et al. | |

FOREIGN PATENT DOCUMENTS

| | | | | |
|---|---|---|---|---|
| AU | 40995/85 | | 4/1985 | |
| AU | 8655314 A1 | | 3/1986 | |
| DE | 3308682 | * | 9/1984 | |
| EP | 146478 | | 12/1984 | |
| EP | 149250 | | 12/1984 | |
| EP | 196102 | * | 10/1986 | 385/135 |
| EP | 0406151 | * | 1/1991 | |
| EP | 479226 | * | 4/1992 | 385/135 |
| EP | 196102 B1 | | 3/1993 | |
| EP | 0538164 | * | 4/1993 | |
| FR | 2531576 | * | 2/1984 | |
| FR | 2587127 | * | 3/1987 | |
| JP | 27 35 106 | | 8/1977 | |
| JP | 59-74523 | | 4/1984 | |
| JP | 60-169811 | | 9/1985 | |
| JP | 61-55607 | | 3/1986 | |
| JP | 61-90104 | * | 5/1986 | 385/135 |
| WO | WO91/10927 | * | 7/1991 | |

OTHER PUBLICATIONS

Northern Telecom bullein #91–004, Issue #2, May, 1991.*
AT&T product bulletin 2987D–DLH–7/89 Issue 2.*
"ITU Fiber Handbook", 7 pages. Mar. 1992.
"Precision Mechanical", 3 pages.

* cited by examiner

*Primary Examiner*—Hemang Sanghavi
(74) *Attorney, Agent, or Firm*—Merchant & Gould P.C.

(57) ABSTRACT

A fiber distribution frame includes a fixture having a plurality of modules mounted side-by-side within said fixture with each of the modules being individually mounted in a line of travel. Each of the modules can be locked in any one of a plurality of discrete positions within the line of travel. Each of the modules contains a plurality of adapters for receiving and retaining fiber optic connectors. Further, the fixture may be tilted downwardly to provide access to the rear of the fixture.

30 Claims, 18 Drawing Sheets

HIGH-DENSITY CABLE DISTRIBUTION FRAME

Matter enclosed in heavy brackets [ ] appears in the original patent but forms no part of this reissue specification; matter printed in italics indicates the additions made by reissue.

This is a continuation of application Ser. No. 08/180,970, filed Jan. 21, 1994 now abandoned.

BACKGROUND OF THE INVENTION

1. Field of the Invention

This invention pertains to the telecommunications industry. More particularly, this invention pertains to a high-density fiber distribution frame for use in the telecommunications industry.

2. Description of the Prior Art

In the telecommunications industry, use of fiber optic cables for carrying transmission signals is rapidly growing. To interconnect fiber optic equipment, fiber distribution frames have been developed. An example of a prior art fiber distribution frame is shown in commonly assigned U.S. Pat. No. 4,995,688.

To fiber distribution frame of U.S. Pat. No. 4,995,688 includes a so-called connector module (item 16 in the '688 patent) having a front panel which carries a plurality of adapters (102). Each of the adapters (102) permits attachment of a fiber optic connector (100) to both sides of the adapter in order to optically connect two fiber optic cables.

Typically, the back side of the adapters (102) are provided with connectors secured to fiber optic cables. The cables are connected to various pieces of fiber optic equipment (such as, a fiber-to-copper convertor for converting DS-3 signals to optical signals).

The connections on the back side of the adapters are semi-permanent. Namely, while the connectors on the back side of the adapters can be easily removed, they are normally installed with the intent to maintain the connection of the connector to the rear side of the adaptor without frequent future changes to the connection. On the front side of the adaptor, the fiber optic connector is secured to a fiber cable (for example, a jumper cable) for cross-connecting to other pieces of optical equipment or to any other destination.

With the increase in use of fiber optic cables in the telecommunications industry, it is desirable to provide fiber distribution frames with increased density. By density, it is meant the number of locations per unit volume or unit area for providing connection on the fiber distribution frame.

In products made according to the aforementioned U.S. Pat. No. 4,995,688, a typical fiber distribution frame will have about 576 fiber optic connector locations. In the industry, it is becoming desirable to substantially increase the density to be in excess of 1,400 connectors per frame.

Examples of high-density fiber distribution frames include a frame marketed under the trademark of Fiber Manager by Northern Telecom and described in Northern Telecom Bulletin No. 91-004, Issue No. 2, May, 1991. Another example includes the High Density Interconnect System (HDIC) of AT&T as disclosed in its Product Bulletin 2987D-DLH-7/89, Issue 2.

One problem associated with prior art high-density fiber distribution frames is that the prior art products require substantial displacement of fibers when access to the fiber connectors is required. For example, the Northern Telecom product houses the fibers and connectors in a molded plastic cassette. The cassette is shown on page 7 of the aforementioned Northern Telecom publication. The particular cassette shown has twelve connectors (paired into six connections). To access any one of the twelve connectors, the cassette must be pulled from the frame approximately three to four inches at which point the cassette drops to an access position as shown on page 6 of the aforementioned bulletin. As a result, even though only one connector may require access, a total of twelve connectors are displaced with substantial displacement of the fiber optic cables associated with each of the twelve connectors.

Unnecessary or excessive displacement of fiber optic cables is undesirable. As fiber optic cables are displaced, they are subject to bending and other forces. As a fiber bends, the fiber can break resulting in loss of transmission through the fiber. Since fibers carry extremely high signal rates, the breakage of a single fiber can result in a substantial loss of data or voice communications. Telecommunications industry standards generally recognize a minimum bending radius of about one and a half inches for optical fibers.

It is an object of the present invention to provide a fiber distribution frame which permits high density, ready access to fiber optic connectors and minimal displacement of fibers when access is being made to connectors.

SUMMARY OF THE INVENTION

According to a preferred embodiment of the present invention, a cable management system is provided which includes a fixture having a plurality of modules mounted on the fixture. Each of the modules is moveable on the fixture for movement along a line of travel. A releasable lock mechanism is provided for releasably locking each of the modules in a plurality of fixed positions along the line of travel. A plurality of mating elements is secured to each of the modules for movement therewith. The mating elements each includes means for connecting a first signal transmission cable at a rear side of the element with a second signal transmission cable at a front side of the element.

DESCRIPTION OF THE PREFERRED EMBODIMENT

With reference now to the several drawing figures in which identical elements are numbered identically throughout, a description of the preferred embodiment of the invention will now be provided.

Figure 1:
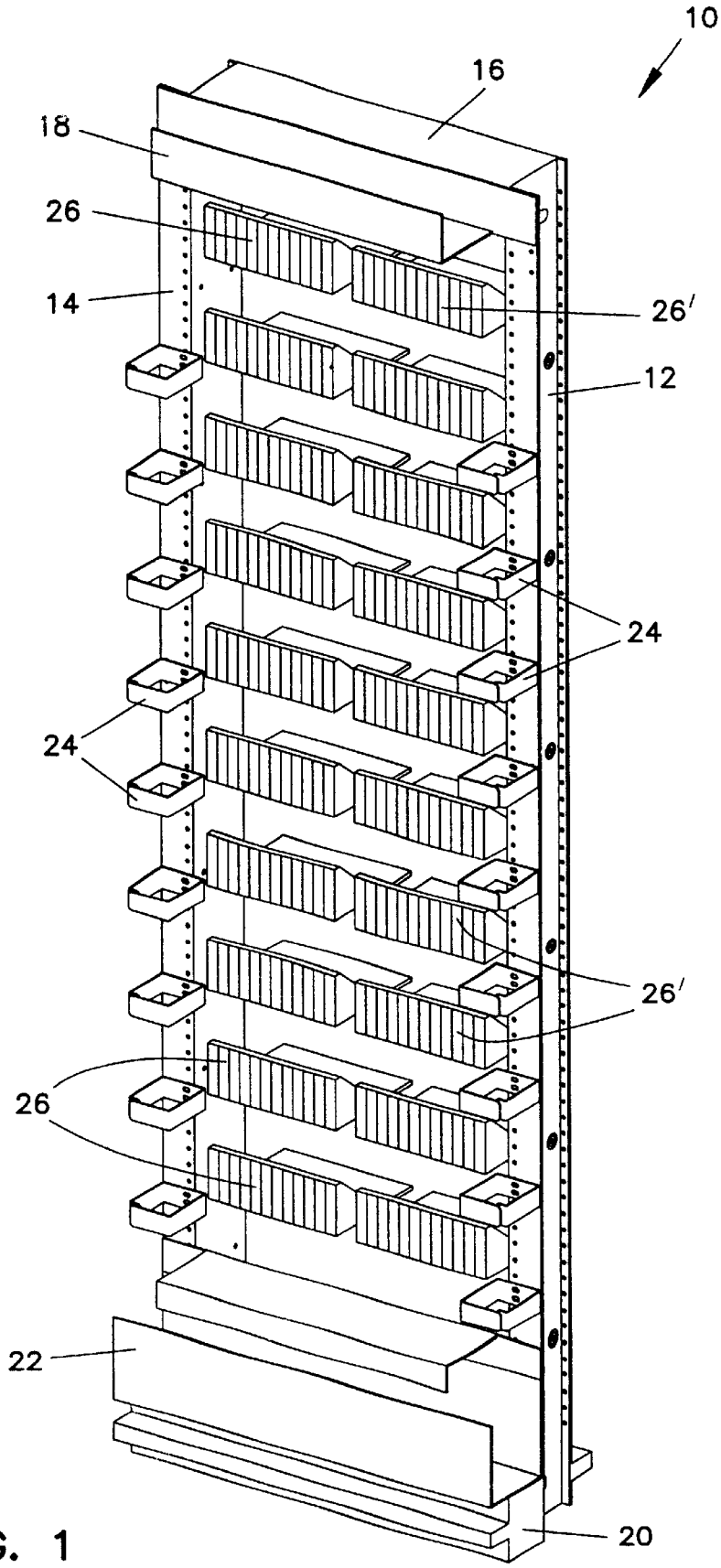
FIG. 1 is a front, top and right side perspective view of a frame according to the present invention.

With initial reference to FIG. 1, a fiber distribution frame 10 is shown. The frame 10 includes spaced-apart side walls 12,14 connected at their upper ends by a top wall 16. Connected to the forward side of the top wall 16 is a trough 18 for carrying cables and the like as is conventional. The bottom of the frame 10 is provided with a pedestal 20 which also has secured to it a trough 22 for carrying cables and the like. The forward edges of the side walls 12,14 are provided with a plurality of clips 24 for holding fiber optic cables extending vertically in front of side walls 12,14.

Contained within frame 10 between side walls 12,14 are a plurality of left and right mounting fixtures 26,26' (schematically shown in FIG. 1). A detailed description of mounting fixtures 26,26' is provided elsewhere in this specification. The fixtures 26,26' are mounted to be aligned in two columns of ten fixtures per column with the two columns in horizontal alignment. It will be appreciated that the specific number of fixtures 26,26' and their alignment is shown for the purposes of illustrating a preferred embodiment and a different number and alignment of fixtures can be provided within a frame 10.

Figure 2:
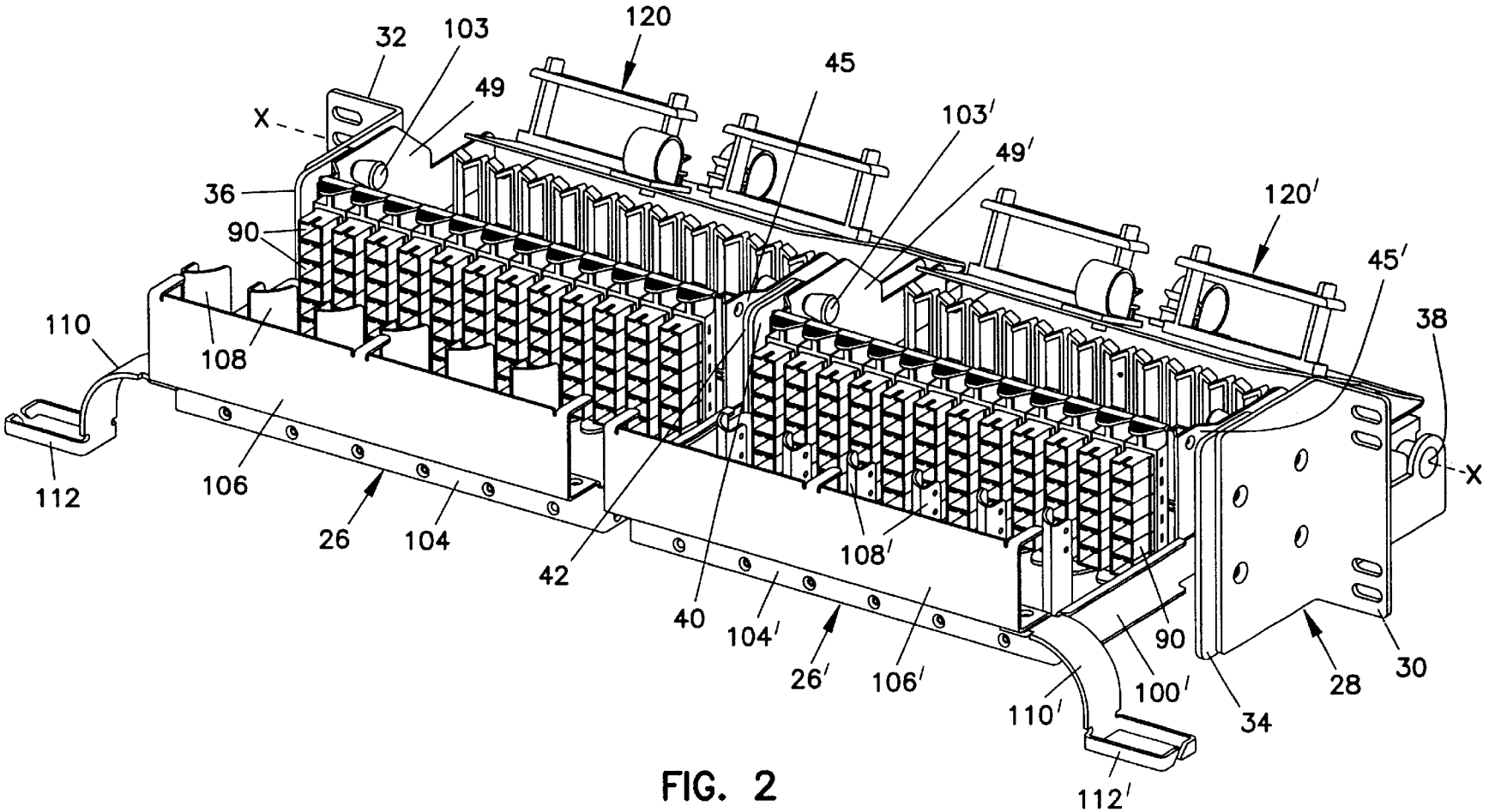
FIG. 2 is a top, front and right side perspective view of two mounting fixtures according to the present invention enjoined by common mounting bracket.
Figure 3:
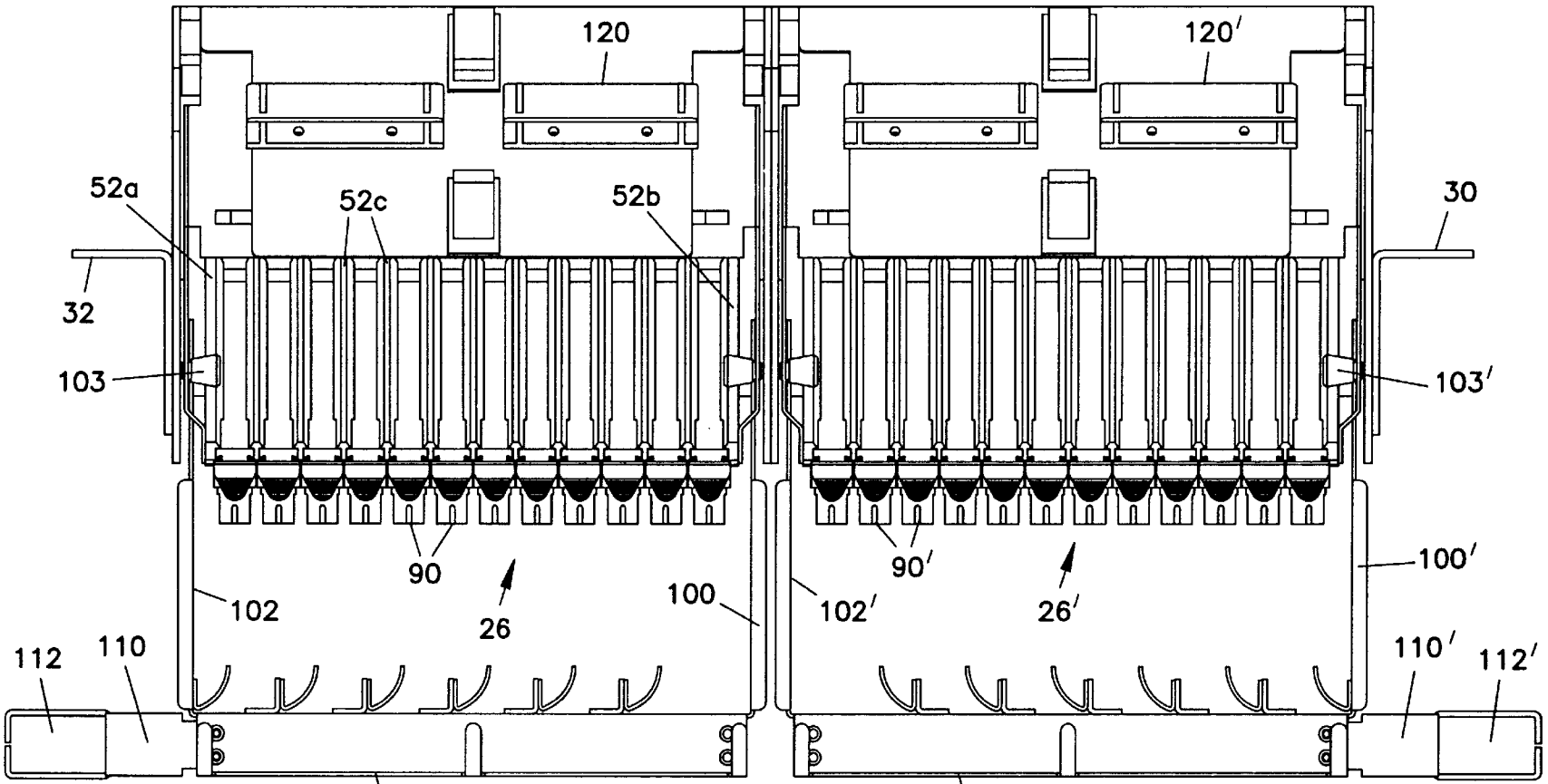
FIG. 3 is a top plan view of the mounting fixtures of FIG. 2.

The fixtures 26,26' are illustrated in FIG. 2 with the fixtures 26,26' paired in a common mounting bracket 28. The mounting bracket 28 includes first and second mounting plates 30,32 for attachment to walls 12,14 respectively. First fixed plates 34,36 are secured to each of mounting plates 30,32, respectively, with the fixed plates 34,36 disposed in parallel, spaced-apart alignment and connected by a pivot rod 38. Second fixed plates 40,42 (best shown in FIG. 4) are also fixedly secured to the pivot rod 38 with plates 40,42 disposed intermediate between plates 34,36 and parallel thereto. Plate 40 opposes plate 34 and plate 42 opposes plate 36.

Figure 5:
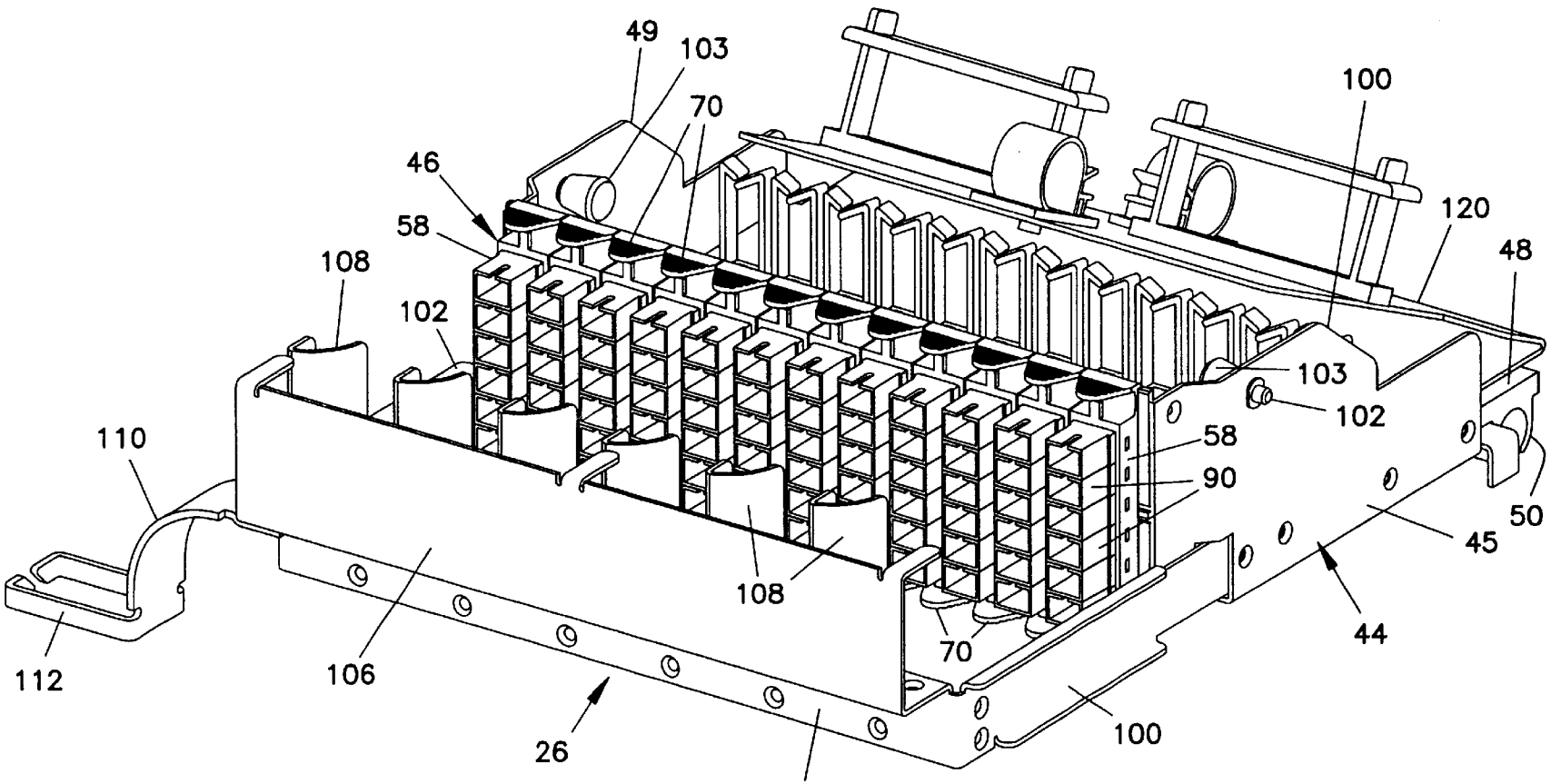
FIG. 5 is a top, front and right side perspective view of a left mounting fixture removed from a mounting bracket.
Figure 6:
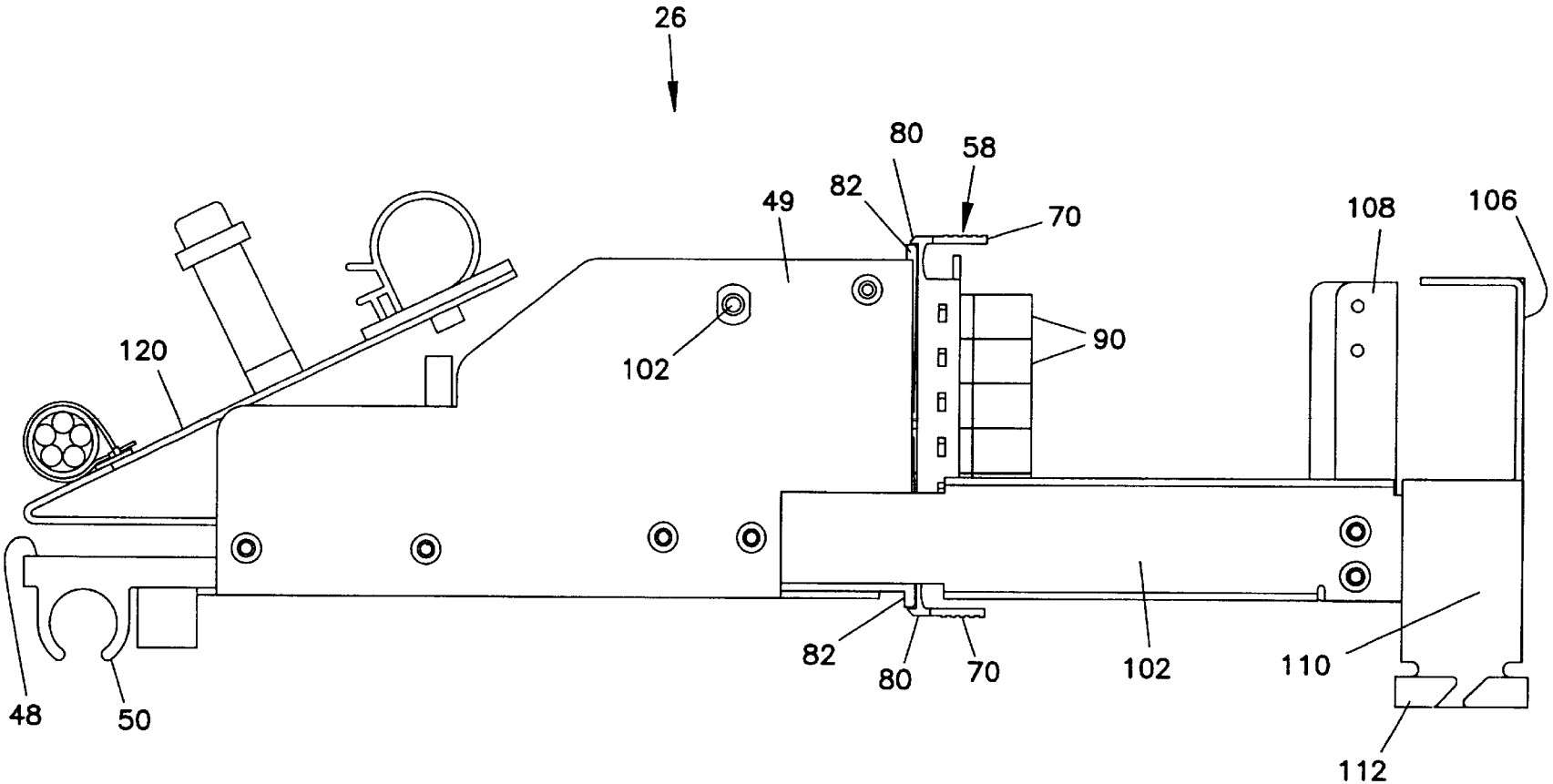
FIG. 6 is a right side elevation view of the mounting fixture of FIG. 5.

A left fixture 26 is separately shown in FIG. 5. Except as will be specifically discussed, fixtures 26,26' are identical and a description of one will suffice as a description of the other. Elements of fixture 26' corresponding to elements of fixture 26 are identically numbered with the addition of an apostrophe to distinguish the fixtures.

Figure 8:
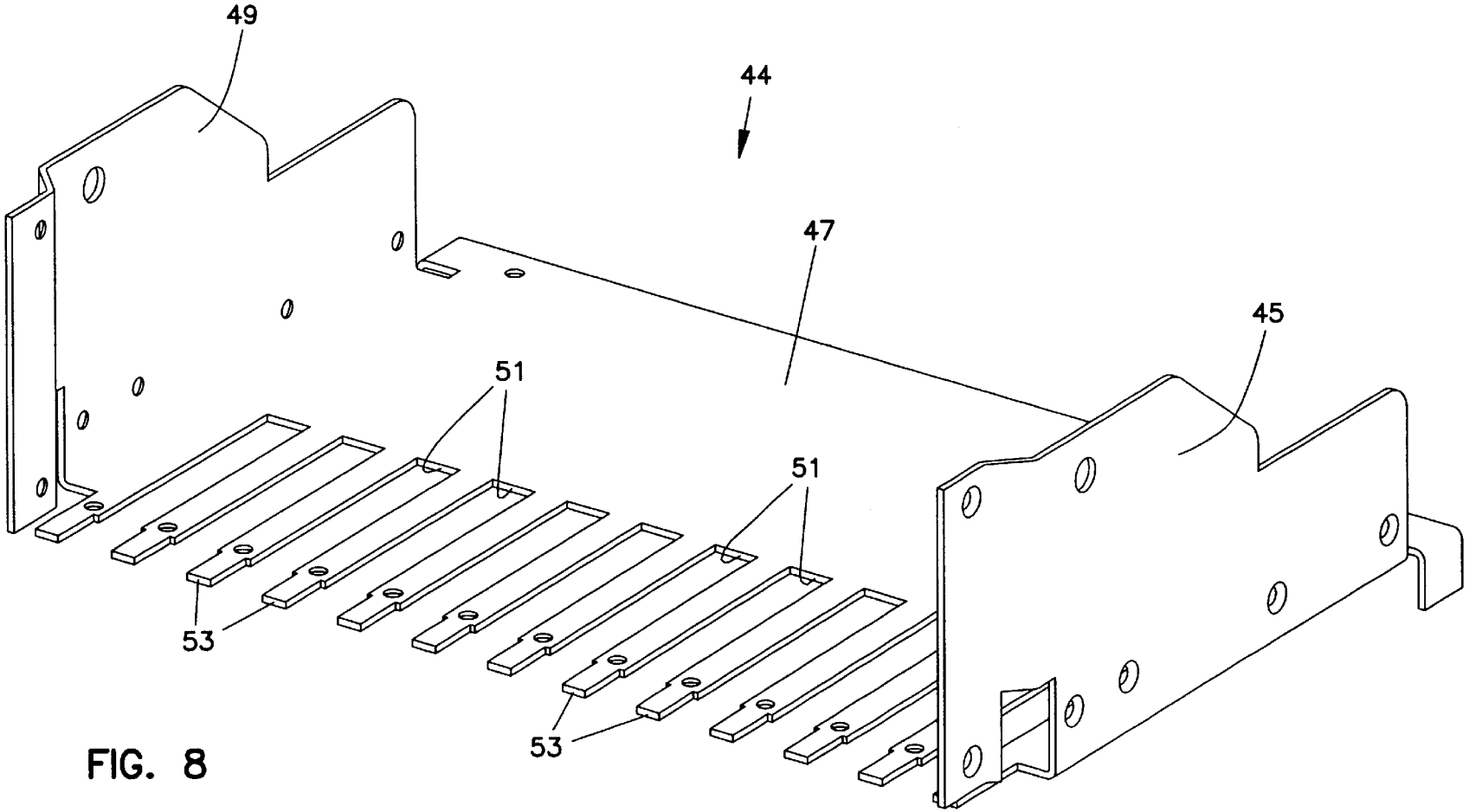
FIG. 8 is a front, top and right side perspective view of a metallic support platform.
Figure 11:
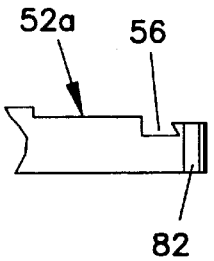
FIG. 11 is an enlarged top plan view of a forward end of the wall of FIG. 9.
Figure 10:
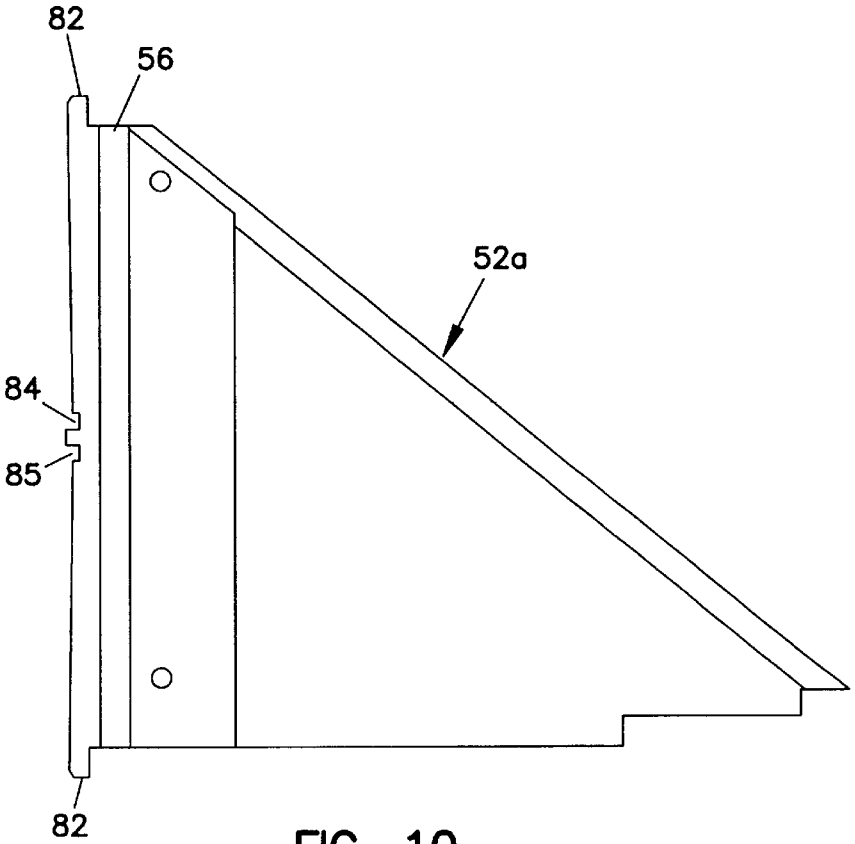
FIG. 10 is a right side elevation view of the wall of FIG. 9.
Figure 9:
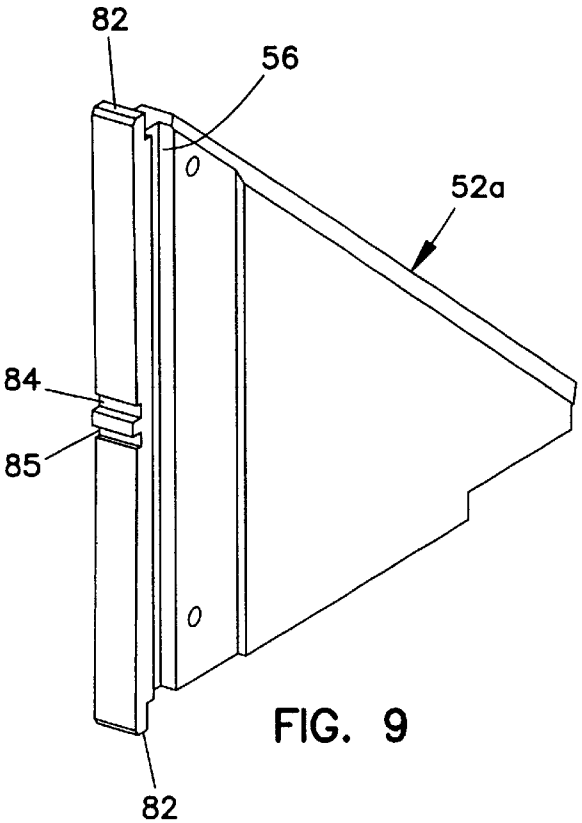
FIG. 9 is a front, top and right side perspective view of a left retaining wall.
Figure 14:
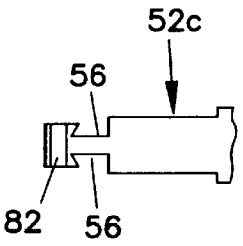
FIG. 14 is an enlarged top plan view of a forward end of the wall of FIG. 12.
Figure 13:
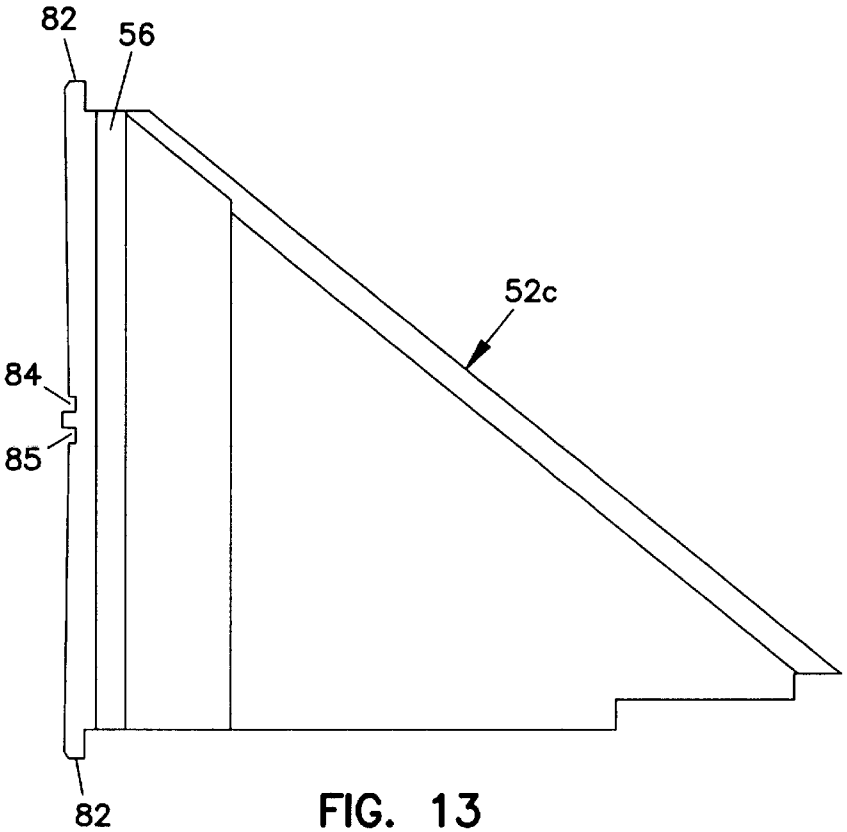
FIG. 13 is a right side elevation view of the wall of FIG. 12.
Figure 12:
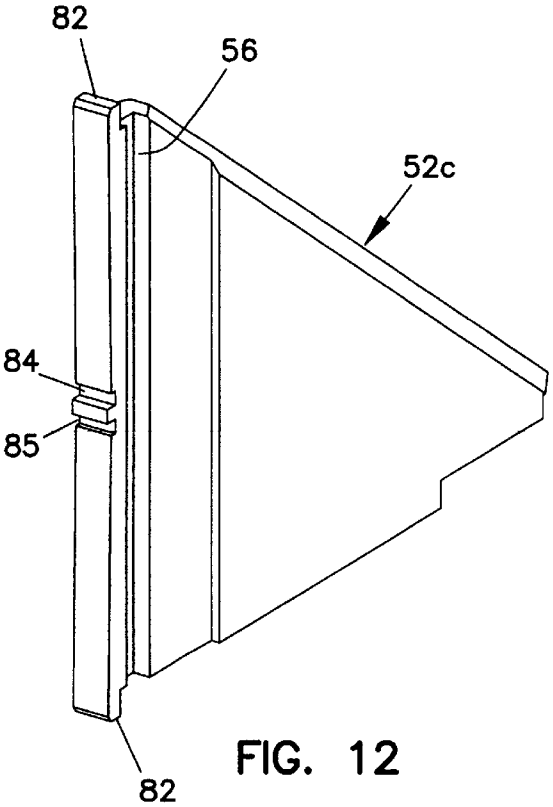
FIG. 12 is a front, top and right side perspective view of a intermediate retaining wall.
Figure 17:
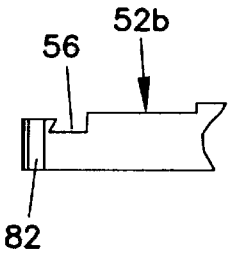
FIG. 17 is a top plan view of a forward end of the wall of FIG. 15.
Figure 16:
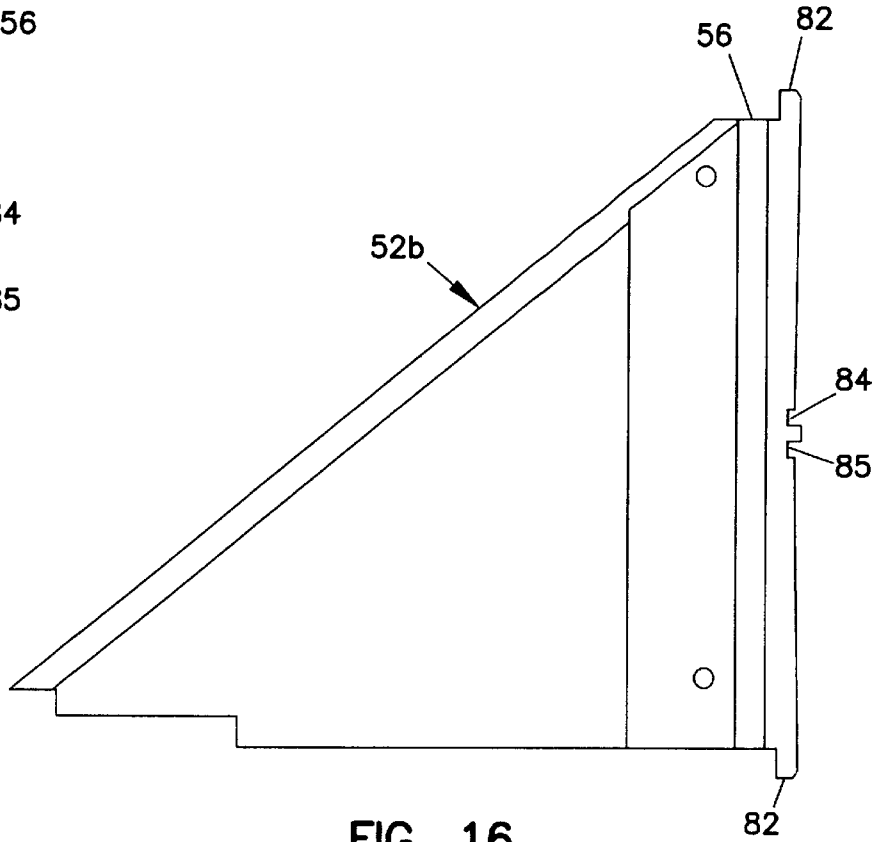
FIG. 16 is left side elevation view of the wall of FIG. 15.
Figure 15:
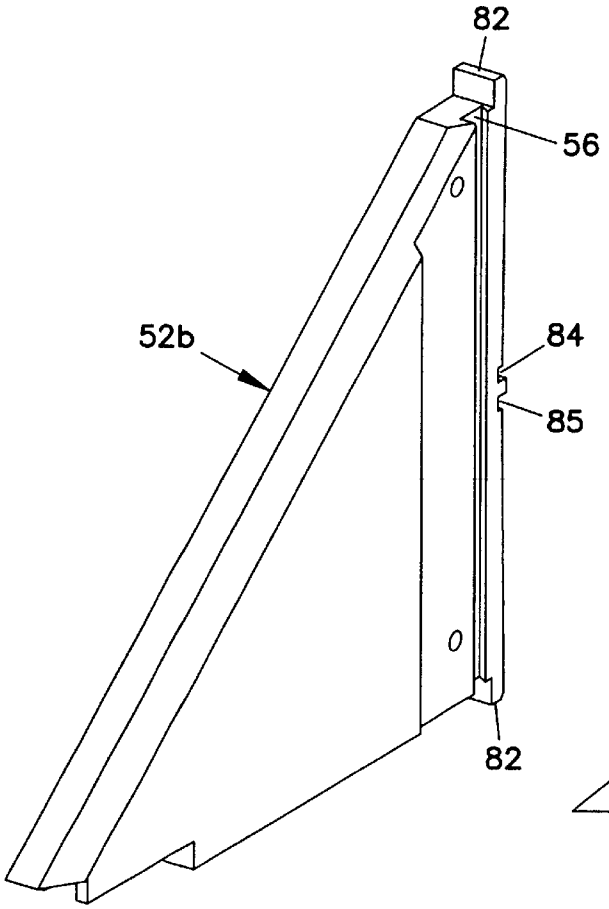
FIG. 15 is a rear, top and left side perspective view of a right retaining wall.

The fixture 26 includes a metallic support platform 44 and a plastic molded cross-connect tray 46. The support platform 44 is separately shown in FIG. 8 and includes parallel side walls 45,49 spaced apart by a floor portion 47. A leading edge of the floor portion 47 is provided with parallel cut-outs 51 to define a plurality of support fingers 53.

Figure 7:
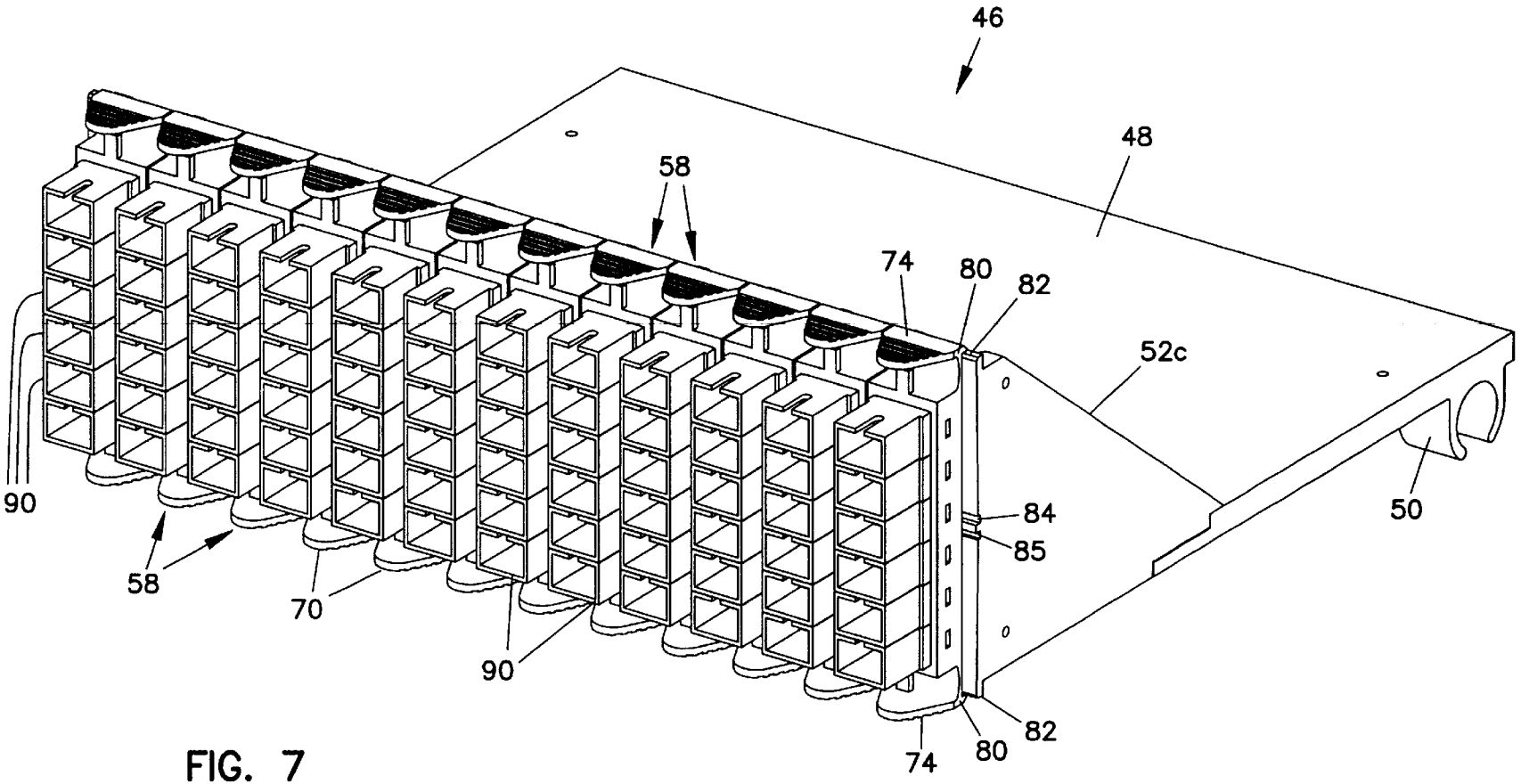
FIG. 7 is a front, top and right side perspective view of a cross-connect tray including adapters.
Figure 18:
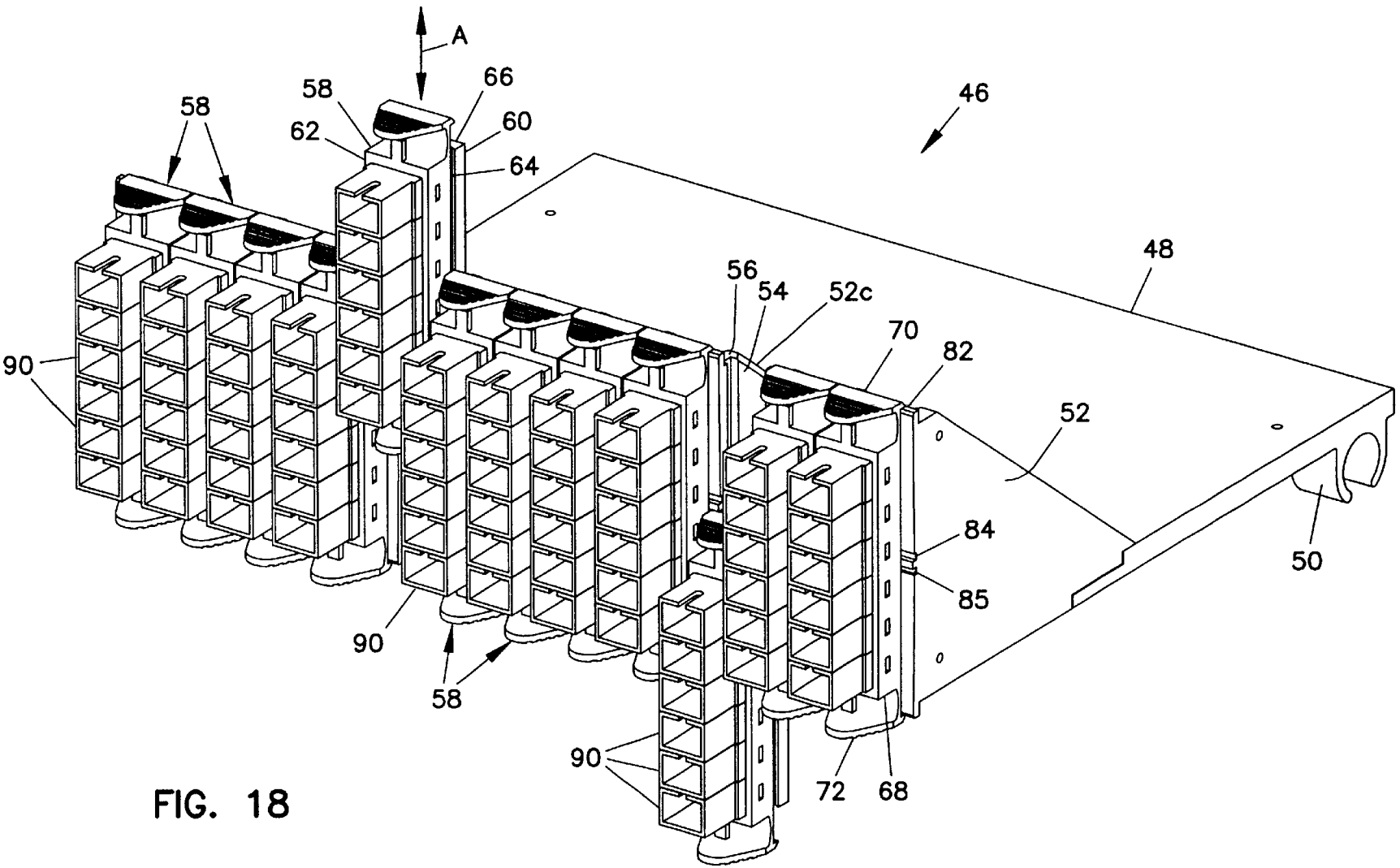
FIG. 18 is a view similar to FIG. 7 showing connector modules shifted.
Figure 19:
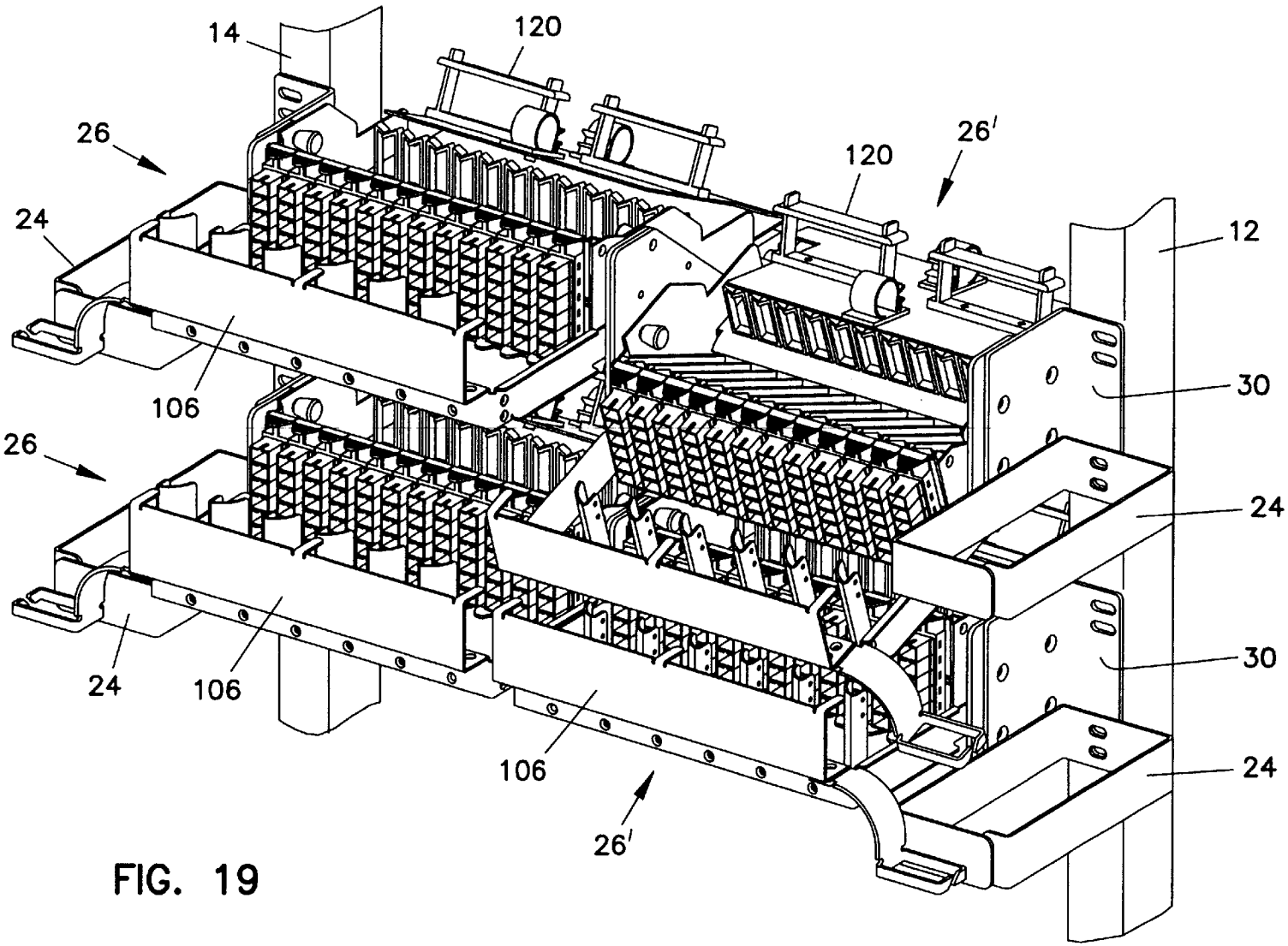
FIG. 19 is a front, top and right side perspective view of four mounting fixtures mounted in a frame with an upper right side fixture provided to a down position.
Figure 20:
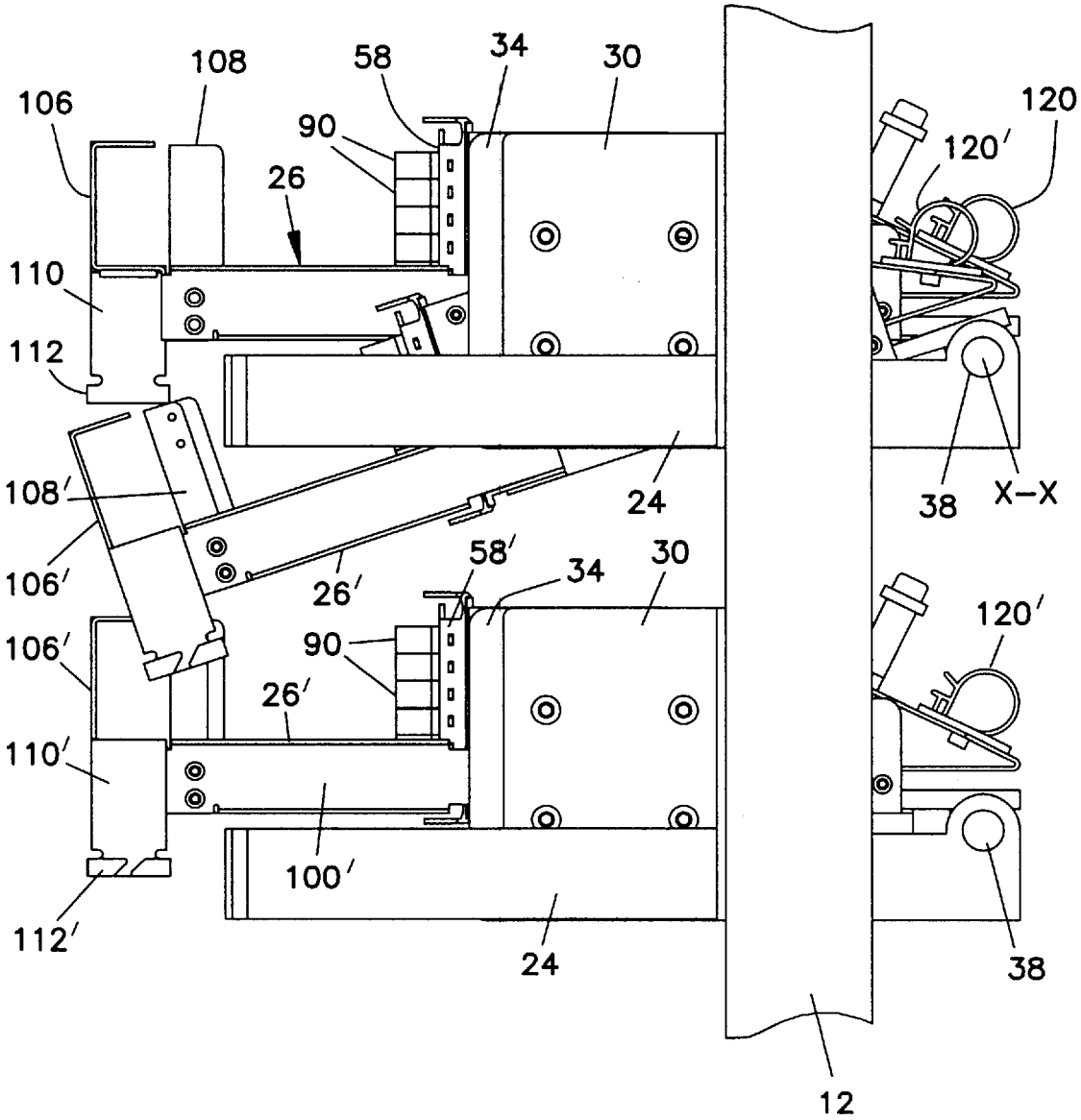
FIG. 20 is a side right elevation view of the view of FIG. 19.
Figure 21:
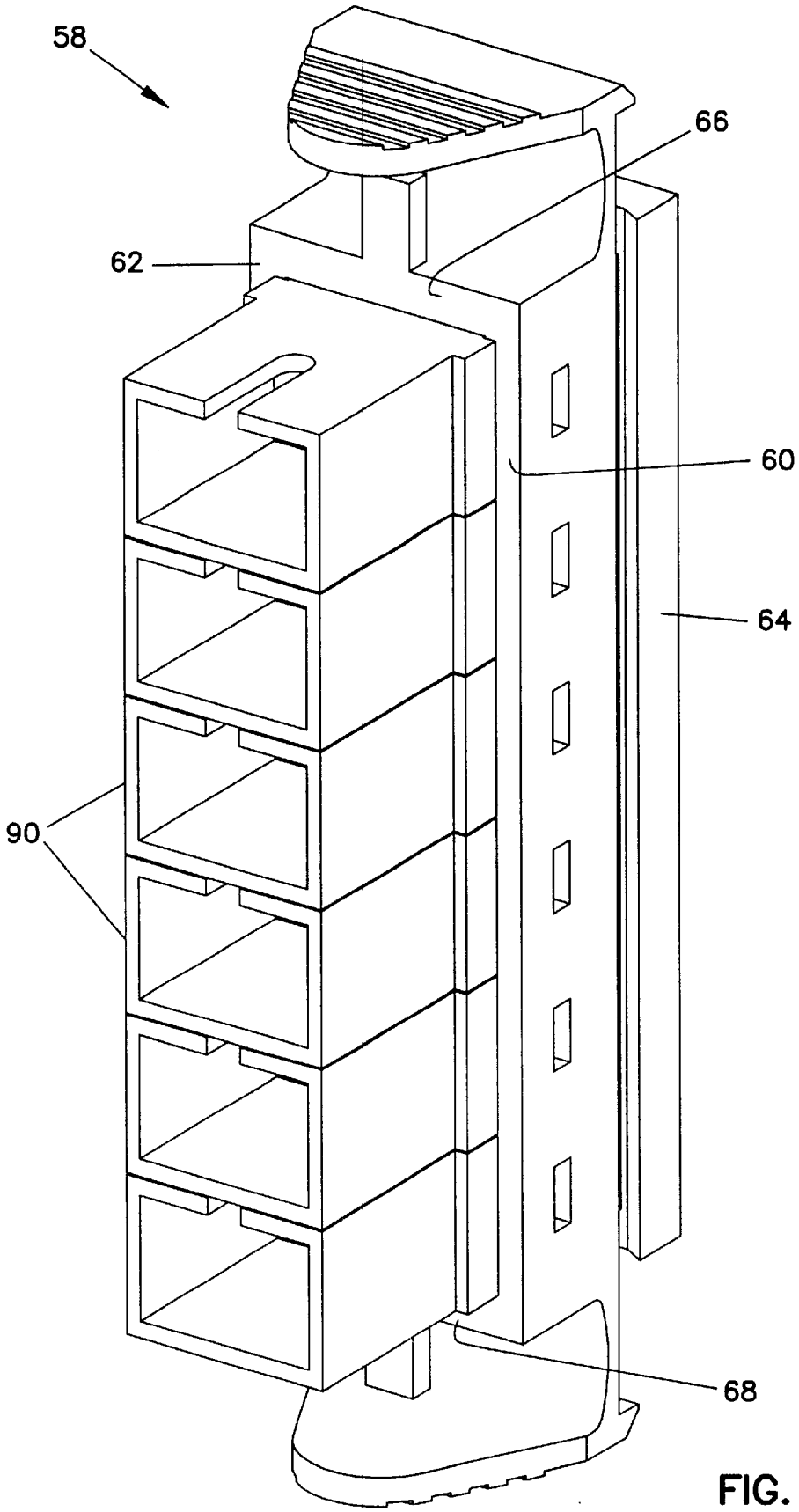
FIG. 21 is a front, top and right side per view of a connector module according to the present invention.
Figure 22:
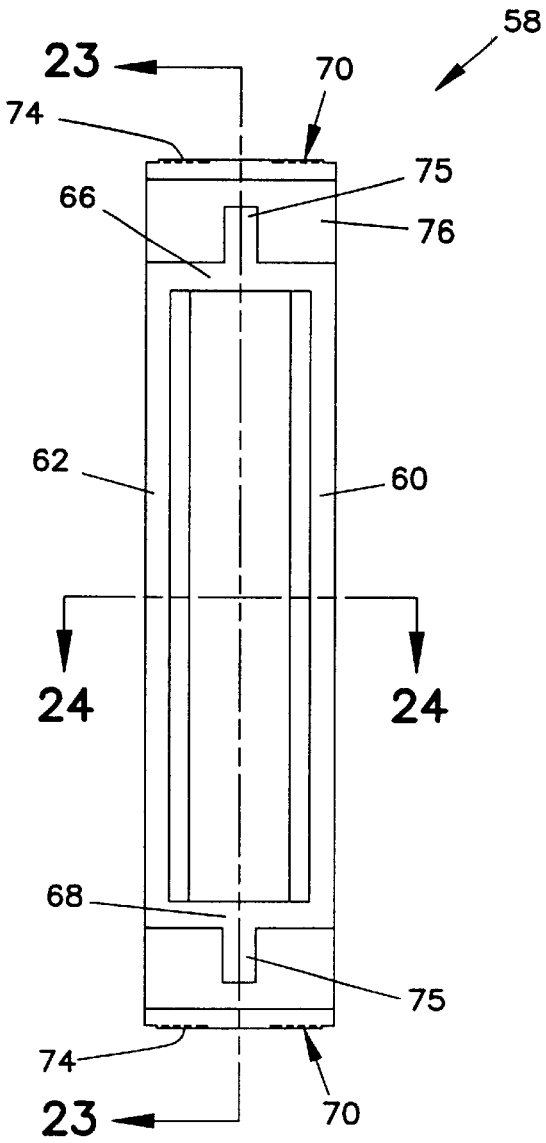
FIG. 22 is a front elevation view of the connector module of FIG. 21.
Figure 23:
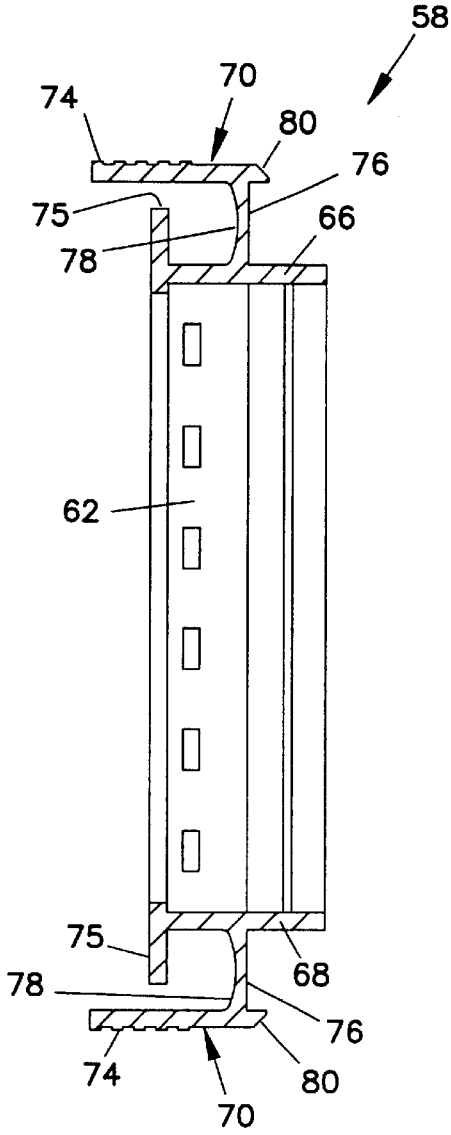
FIG. 23 is a view taken along lines 23—23 of FIG. 22.
Figure 24:
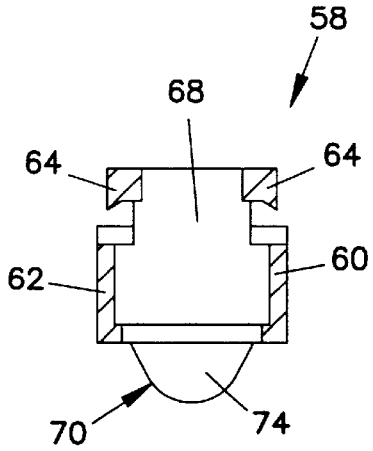
FIG. 24 is a view taken along lines 24—24 of FIG. 22.

The cross-connect tray 46 is separately shown in FIGS. 7 and 18. The cross-connect tray 46 includes a flat base 48 (which is secured to floor 47 of platform 44). Intricately molded with base 48 at a rear edge thereof are clips 50 sized to snap fit onto pivot rod 38 permitting clips 50 (and hence cross-connect tray 46) to rotate or pivot about the axis (X—X in FIG. 2) of the pivot rod 38. Pivot rod 38 and axis X—X are horizontal when the mounting fixture 26 is secured within the frame 10.

The upper surface of the base 48 is provided with a plurality of triangular-shaped walls including a left wall 52a, a right wall 52b and a plurality of intermediate walls 52c. The walls 52a–52c are numbered and shown assembled in FIG. 26 and are shown separately in FIGS. 9–17.

A wall is mounted on each support finger 53. The plurality of walls 52a–52c are vertical when base 48 is horizontal and each extends generally perpendicular to the pivot axis X—X of clips 50 with the walls 52a–52c disposed in spaced-apart, parallel alignment. Accordingly, opposing surfaces of each of the walls 52a–52c define a plurality of discrete channels 54. (FIG. 18). Also, opposing surfaces of each of the walls 52a–52c have formed therein parallel spaced-apart grooves 56 which extend perpendicular to the base 48.

Disposed within each of the channels 54 is a module 58. As best shown in FIGS. 21–24, each of modules 58 is a generally box-like construction including side walls 60,62. Each of side walls 60,62 is provided with a projecting rail 64 sized to be sideably received within grooves 56. Accordingly, rails 62,64 are received within grooves 56 to permit individual movement of each of the modules 58 relative to the platform 48 only in a direction of travel A (FIG. 18) which is perpendicular to the pivot axis X—X of the clips 50. The direction of travel A is vertical when base 48 is horizontal.

The rails 64 have beveled edges which taper inwardly toward the side walls 60,62. The groove 56 are complementary shaped. Accordingly, when rails 64 are received within the grooves 56, the rails can only move in the direction of the grooves 56. This structure provides lateral support to the walls 52a–52c.

The modules 58 further include top and bottom walls 66,68 which are provided with a releasable lock mechanism 70 for independently locking each of the modules 58 in any one of a plurality of fixed positions along the line of travel A. The lock mechanisms 70 include tabs 74 secured to the walls 66,68 by hinge members 76. It will be appreciated that each of modules 58 is formed from an injection-molded plastic. The hinge member 76 is provided with a narrowed mid-point 78 (FIG. 23) to permit the material of the hinge member 76 to rotate about the mid-point 78 when an operator grasps the tab 74 and urges it toward the walls 66,68. The tabs 74 are also provided with a rear edge 80 (FIG. 23) which projects rearedly from the hinge members 76. Further, a stop 75 is provided on each of walls 66,68 to limit the stroke of tabs 74 to prevent breakage of narrowed mid-point 78.

The lock mechanism 70 are sized such that the rear edges 80 oppose and abut the top and bottom edges 82 of the wall members 52a–52c when the modules 58 are in a first or neutral position as shown in FIG. 7. In this position, the lock members 74 are shown biased to a lock position with the rear edges 80 opposing and abutting the top and bottom edges 82 to prevent movement of the modules 58 along the line of travel A.

By pressing on the tabs 74 and urging them toward the top and bottom walls 56,58. The lock mechanism 70 are moved from their locked position to an unlocked position with the rear edges 80 clear of the top and bottom edges 82. So cleared, the modules 58 may be individually moved either up or down (i.e., in the direction of the line of travel A as shown in FIG. 18). Centrally positioned between the top and bottom edges 82 on each of walls 52a–52c are grooves 84,85. When either of the lock mechanisms 70 is in the region of the groove 84,85, an operator may release the lock mechanism 70 such that its natural bias causes the edge 80 to be received within the grooves 84,85. Accordingly, each of the modules 58 may be locked in an up position (with edge 80 of the lower lock mechanism 70 received within lower groove 85) or in a down position (with edge 80 of the upper lock mechanism 70 received within upper groove 84).

Each of modules 58 has a hollow construction which in a preferred embodiment is sized to receive six fiber optic connector adapters disposed in an abutting linear array. In the preferred embodiment shown, the specific adapters 90 are well-known and so-called SC adapters for receiving and retaining SC connectors at opposite ends of each of the adapters 90 such that each adaptor 90 joins and optically couples two fiber optic connectors.

It will be appreciated that SC adaptors form no part of this invention per se. Such adapters are commercially available, well-known items. An example of such an adaptor is shown in commonly-assigned and co-pending U.S. Pat. application Ser. No. 08/065,139, filed May 30, 1993. Also, it will be appreciated that while SC adapters 90 are shown in use in a preferred embodiment, different types of adapters for different types of fiber optic connectors (for example, FC, D4 or other connectors) could also be utilized in the modules 58 with internal geometry of the modules 58 simply modified to accommodate different external geometry of different connector adapters.

Figure 4:
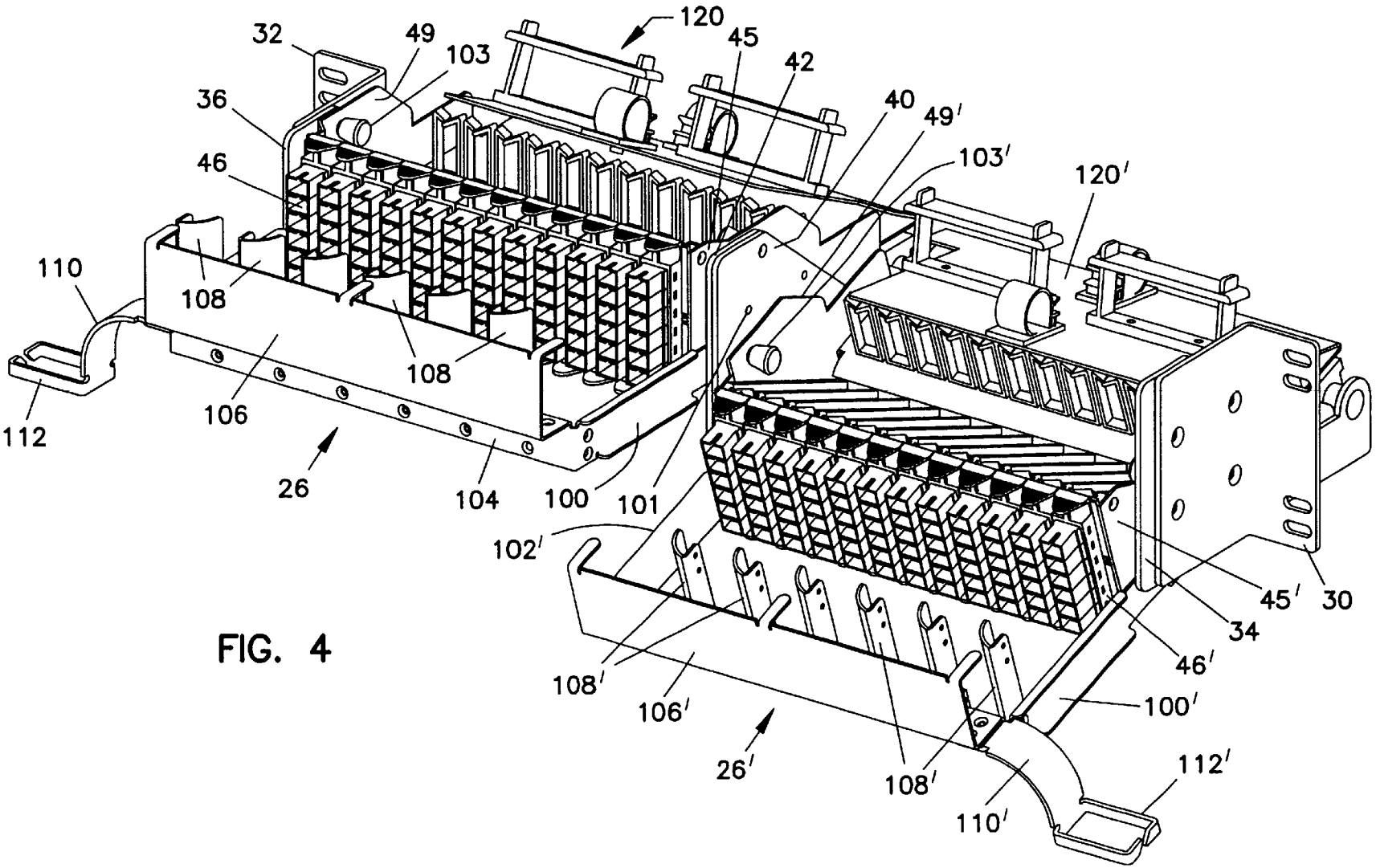
FIG. 4 is a view similar to FIG. 2 showing a right mounting fixture pivoted to a down position.

With reference now back to FIGS. 4 and 5, each of the cross-connect trays 46 is secured (through bolts or the like) to the support platforms 44. Sidewalls 45, 49 of left fixture 26 are sized to closely face walls 42,36. Side walls 45' 49' of right fixture 26' are sized to closely face walls 34,40. The side walls 45,49 carry spring-loaded locking tabs 103 which can be pulled inwardly to retract a lock pin 102 (FIG. 5). Upon release of the tabs 103, the tabs 103 are spring-biased to permit locking pins 102 to protrude beyond the exterior of the side walls 45,49. Opposing surfaces of the plates 34,40, 42 and 36 are provided with detents 101 (FIG. 4) sized to receive the pins 102 such that the support platform 44 and attached cross-connect trays 46 may be rotated about pivot rod 38 to any one of a plurality of rotated positions and fixed in place in the fixed position. FIG. 4 shows a mounting fixture 26 in a horizontal position and a second mounting fixture 26' rotated about pivot rod 38 to a down position.

The forward edge of each of the support platforms 44 is provided with extension side walls 100,102 which extend from the side plates 45,49. The extension walls 100,102 extend forwardly beyond the front side of the adapters 90 by a distant sufficient to permit connectors to be inserted within the adapters 90 as will become apparent.

The extension walls 100,102 are joined by a forward wall 104. Extending upwardly from forward wall 104 is a designation plate 106 which provides a flat surface generally parallel to the plane of the front ends of the adapters 90. The flat surface of the designation plate 106 provides a surface on which a designation strip can be attached to permit an operator to place identifying information or the like. The plate 106 also protects the adaptors 90 and attached connectors and fibers from physical damage.

Secured to the forward wall 104 and spaced between the designation plate 106 and the adapters 90 are a plurality of arcuate fanning clips 108. For the left side fixtures 26, the fanning chips 108 are arced to direct fibers from the adapters to the left side of the frame. For the right side fixture 26', the fanning clips 108 are oriented to direct fibers from the adapters 90 to the right side of the frame. Further, each of the fixtures 26 is provided with a radius plate 110 with an attached fanning clip 112. The plate 110 permits fibers to be draped downwardly through clip 112 with the radius 110 limiting the bending of the fibers to prevent excess bending.

Connected to the fixture 26 on the rear side thereof may be provided any one of a plurality of different styles of cable management fixtures 120. The cable management fixtures 120 shown in FIG. 4 includes a plurality of fanning clips for cable management as well as takeup spools for taking up excess amounts of cable. It will also be appreciated that the rear area of the fixtures 26 can be provided with a variety of different cable management devices including splice trays or the like.

Figure 25:
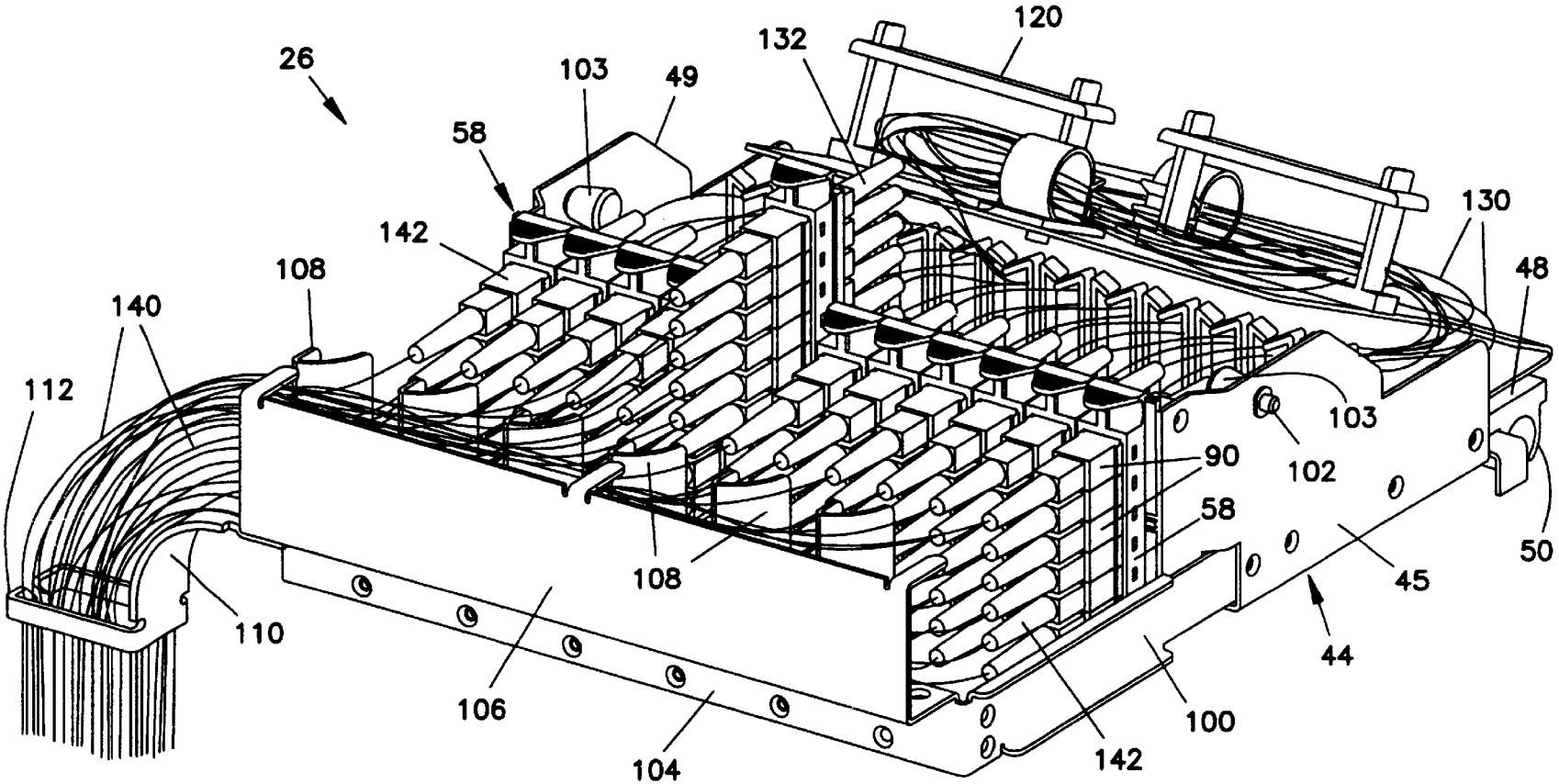
FIG. 25 is a front, top and right side perspective view of a fixture according to the present invention and connected to fiber optic cables.
Figure 26:
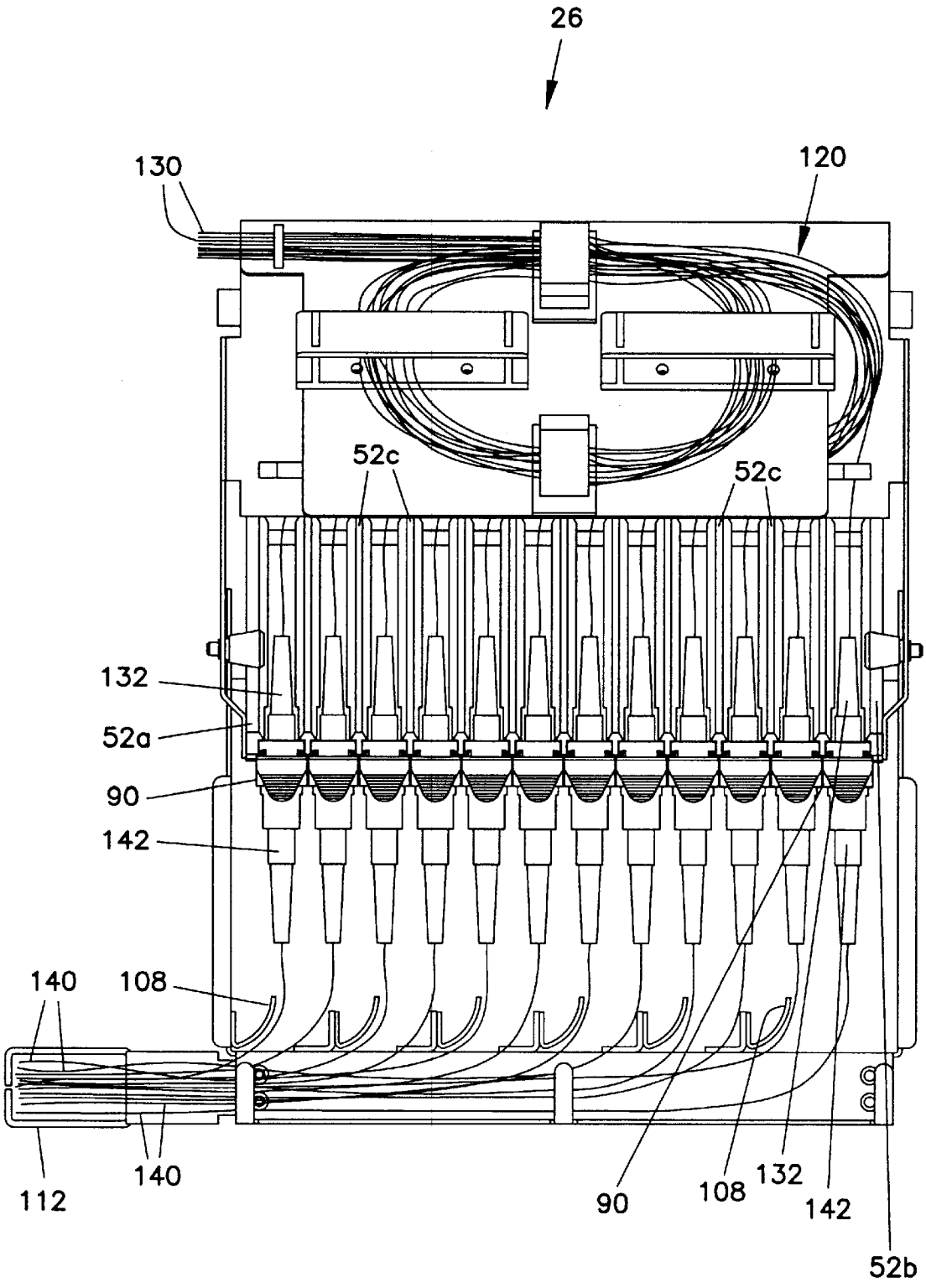
FIG. 26 is a top plan view of the fixture of FIG. 25.

With reference now to FIGS. 25–26, the reader will note use of the fixture 26 in use for organizing and cross connecting a plurality of optical fibers. Equipment fibers 130 enter the rear of the fixture 26 with excess fiber lengths wrapped around the cable management device 120. The equipment fibers 130 may originate from any one of a plurality of different types of fiber optic equipment such as fiber-to-copper convertors. Each of the fibers 130 is terminated at an SC connector 132. The connector 132 is received within the back end of adapters 90. Cross-connect fiber cables (frequently referred to as jumpers) 140 are passed through clip 112 and individually fanned by fanning clips 108 toward adapters 90. Each of the fibers 140 terminates at an SC connector 142 which is each received within the forward end of an adaptor 90 such that each one of connectors 132 is individually connected to a singular one of a plurality of connectors 142.

From time to time, it is desirable to replace or move the cross-connect cables 140. If the cables or connectors of the top three adaptors of a given module 58 are desired to be accessed, the operator grasps the locking tabs 74 and moves the module upwardly to the position of the raised module 58 shown in FIG. 25. In this position, each of the top three of the connectors 142 of the module is readily accessible without interference from the designation strip 106. If the bottom three of the connectors 142 of the same module 58 are to be accessed, the operator simply engages the tabs 74 and moves the connector downwardly until the top tab 74 is received within the groove 84 to lock the module 58 in the down position. In the down position, the bottom three of the connectors 142 is accessible beneath the designation strip 106 without interference from the designation strip 106. When no connectors are to be accessed, the module 58 is placed in its neutral position with all of the connectors 142 protected from impact or other interference by means of the designation strip 106 and the forward wall 104.

The reader will note that in order to obtain access to any one of the connectors 142 in a module 58, the module 58 is only moved a very small distance. Also, only six adaptors 90 are moved at a time. The very small movement associated with accessing each of the connectors results in a minimal probability of damage of any one of the fiber optic cables.

The benefits of the present invention include limited displacement of the fibers. In the prior art, when a tray containing several connectors is moved, the fibers are displaced axially by a substantial amount (e.g., about 3 inches). In the present invention, as a module 58 is moved up or down (about 1.5 inches) the fiber experiences very little axial movement with most of the movement accommodated by a lifting or lowering movement of the fiber transverse to the fiber's axis.

While the back connectors 132 are semi-permanently installed, it is desirable, from time to time, to be able to have access to the connectors 132 (particularly when the connectors 132 are initially installed). However, if access to back connectors 132 is desired, they may be accessed the same as the front connectors 142 (i.e., by raising or lowering modules 58).

In certain installations, only the front of frame 10 is accessible to an operator. In such installments, access to the cable management device 120 is obtained through the tilt feature of the fixture 26. Namely, to obtain access to the cable management device 120 from the front of frame 10, the tabs 103 are pulled inwardly to retract lock pins 102. With the pins 102 retracted, the entire fixture 26 rotates about the pivot rod 38 to a down position as shown by fixture 26' in FIG. 4. In the down position, the cable management device 120 is readily accessible to an operator facing the front of the frame 10.

Other modifications of the invention may be apparent to one skilled in the art. For example, in the preferred embodiment illustrated, a module 58 with all six adaptors 90 is moved up or down from the neutral position. Alternatively, the module 58, could be split in half with the top half moved up to access the top three connectors and with the bottom half independently moved down to access the bottom three adaptors.

Also, as an alternative, the modules 58 can be provided with additional functions. In the preferred embodiment illustrated, the modules 58 retain only adaptors 90. However, modules 58 can include products other than adaptors 90. For example, modules 58 may house optical splitters, WDM's (wave division multiplexers) or other equipment. While adaptors 90 may be used with such enhancements, adaptors 90 may not be necessary (e.g., such enhanced modules may be provided with fiber pigtails).

From the foregoing detailed description of the present invention, it has been shown how the objects of the invention have been attained in a preferred manner. However, modifications and equivalents of the disclosed concepts, such as those which readily occur to one skilled in the art, are intended to be included within the scope of the claims which are appended hereto.

What is claimed is:

1. A signal transmission cable management system comprising:

a fixture;

a plurality of modules mounted on said fixture with each of said modules movably mounted on said fixture for movement along a line of travel, each one of said modules including a plurality of adaptor means for holding a fiber optic connector, each one of said adaptor means movable with said one of said modules along said line of travel;

releasable lock means for releasably locking each of said modules in any one of a plurality of fixed positions along said line of travel;

means for connecting a first signal transmission cable at a rear side of said module with a second signal transmission cable connected at a front side of said module.

2. A system according to claim 1 wherein said modules each have a longitudinal axis; said modules mounted on said fixture in side-by-side relation with said longitudinal axes generally parallel to said line of travel, said plurality of adaptor means linearly disposed along said longitudinal axis.

3. A system according to claim 1 wherein said fixture includes a plurality of spaced-apart walls, opposing pairs of said walls, defining a plurality of channels, each of said modules being disposed within a respective channel, cooperating guide means for each of said modules and said walls for attaching said modules to said walls and accommodating movement of each of said modules along said line of travel.

4. A system according to claim 1 wherein each of said plurality of fixed positions includes a first, second and third position, each linearly separated along said line of travel.

5. A system according to claim 1 comprising a frame having mounting means for mounting said fixture in said frame:

said mounting means including a pivot attachment for said fixture to pivot relative to said frame about said pivot axis.

6. A system according to claim 5 wherein said pivot axis is generally perpendicular to said line of travel.

7. A system according to claim 5 wherein said mounting means further includes a frame lock for releasably locking said fixture in any one of a plurality of a pivoted positions about said pivot axis.

8. A system according to claim 1 comprising a plurality of mating elements secured to each of said modules, said mating elements each including means for connection of said front side, respectively, with said first and second cables optically coupled.

9. A system according to claim 8 wherein said mating elements are mounted in a linear array defining a longitudinal axis for each of said modules, said modules mounted on said fixture in side-by-side relation with said longitudinal axes generally parallel to said line of travel.

10. A signal transmission cable management system comprising:

a fixture;

a plurality of modules mounted on said fixture with each of said modules movably mounted on said fixture for movement along a line of travel;

releasably lock means for releasably locking each of said modules in any one of a plurality of fixed positions along said line of travel, each of said plurality of fixed positions including a first, second and third position, each linearly separated along said line of travel;

means for connecting a first signal transmission cable at a rear side of said module with a second signal transmission cable connected at a front side of said module;

a forward wall disposed, spaced from and opposing said front sides of said modules said modules shielded by said forward wall when said one of said modules is in said first position and with a first upper portion of said one of said modules exposed above an upper edge of said forward wall when said one is in said second position and with a second portion of said one exposed below a lower edge of said forward wall when said one is in said third position.

11. A signal transmission cable management system comprising:

a fixture;

a plurality of modules mounted on said fixture with each of said modules movably mounted on said fixture for movement along a line of travel;

releasable lock means for releasably locking each of said modules in any one of a plurality of fixed positions along said line of travel;

means for connecting a first signal transmission cable at a rear side of said module with a second signal transmission cable connected at a front side of said module;

said fixture including a plurality of spaced-apart walls, opposing pairs of said walls, defining a plurality of channels, each of said modules being disposed within a respective channel, cooperating guide means for each of said modules and said walls for attaching said modules to said walls and accommodating movement of each of said modules along said line of travel;

said lock means including a locking member on each of said modules, said locking member moveable between a locked position and an unlocked position; said walls and said locking member including cooperating elements for restraining said modules for movement along said line of travel at each of said plurality of fixed positions when said locking member is in said locked position and accommodating movement of said module along said line of travel when said locked member is in said unlocked position.

12. A system according to claim 11 wherein said cooperating elements includes a detent formed in said walls and corresponding with said plurality of fixed positions, said locked member including an edge sized to be received within said detent when said lock member is in said locked position and said edge removed form said detent when said lock member is in said unlocked position.

13. A system according to claim 12 wherein said lock member is biased toward said locked position.

14. A signal transmission cable management system comprising:

a fixture;

a plurality of modules mounted on said fixture with each of said modules movably mounted on said fixture for movement along a line of travel;

releasable lock means for releasbly locking each of said modules in any one of a plurality of fixed positions along said line of travel;

means for connecting a first signal transmission cable at a rear side of said module with a second signal transmission cable connected at a front side of said module;

said fixture including a plurality of spaced-apart walls, opposing pairs of said walls, defining a plurality of channels, each of said modules being disposed within a respective channel, cooperating guide means for each of said modules and said walls for attaching said modules to said walls and accommodating movement of each of said modules along said line of travel;

said cooperating guide means including a rail on each of said modules and a mating groove on at least one of said walls opposing each of said channels with said rails slidable received within said groove and with said rails sliding within said groove along said line of travel.

15. In a signal transmission cable management system having a fixture including a plurality of spaced apart walls defining a plurality of parallel spaced apart cavities, said walls including first and second parallel and opposing recesses; an optic module for mounting in said cavities, said module comprising:

a body sized to be slidably received within said cavity for movement along a line of travel, said body having first and second parallel rails, said rails sized to be slidably received within said recesses;

said body including a plurality of adaptor means for connecting a plurality of fiber optic cables to said body, said plurality of adaptor means linearly aligned along said line of travel;

said body including latch means for securing said body to said fixture in any one of a plurality of fixed positions along said line of travel.

*16. A signal transmission cable management system comprising:*

*a fixture; and*

*a plurality of modules mounted on said fixture with each of said modules movably mounted on said fixture for movement along a line of travel, each one of said modules including a plurality of adaptor means for holding a fiber optic connector, each adaptor means having opposite ends for coupling to a fiber optic cable connector, each one of said adaptor means movable with said one of said modules along said line of travel, said plurality of adaptor means linearly disposed along said line of travel for each of said modules.*

*17. A system according to claim 16 wherein each of said plurality of adaptor means couples first and second SC fiber optic cable connectors.*

*18. A system according to claim 16 wherein said modules each have a longitudinal axis, said modules mounted on said fixture in side-by-side relation with said longitudinal axes generally parallel to said line of travel, said plurality of adaptor means linearly disposed along said longitudinal axis.*

*19. A system according to claim 16 wherein said fixture defines a plurality of channels, each of said modules being disposed within a respective channel, and further comprising cooperating guides on each of said modules and within said channels accommodating movement of each of said modules along said line of travel.*

*20. A system according to claim 19 further including a plurality of spaced-apart walls, opposing pairs of said walls defining said plurality of channels, each of said modules being disposed within a respective channel, and wherein said cooperating guides are on each of said walls for attaching said modules to said walls.*

*21. A signal transmission cable management system comprising:*

*a fixture;*

*a plurality of modules mounted on said fixture with each of said modules movably mounted on said fixture for movement along a line of travel, each one of said modules including a plurality of adaptor means for holding a fiber optic connector, each adaptor means mountable to a fiber optic cable connector, each one of said adaptor means movable with said one of said modules along said line of travel; and*

*a releasable lock for locking each module to said fixture in a first position, each of said locks being releasable to allow movement of each of said modules to a second position along said line of travel.*

*22. A system according to claim 21 wherein each of said plurality of adaptor means is mountable to an SC fiber optic cable connector.*

*23. A signal transmission cable management system comprising:*

*a fixture; and*

*a plurality of modules movably mounted on said fixture with each of said modules individually movable relative to said fixture, each one of said modules including a plurality of adaptor means for holding a fiber optic connector, each adaptor means mountable to a fiber optic cable connector, each one of said adaptor means movable with said one of said modules, wherein said modules each have a longitudinal axis, said modules mounted on said fixture in side-by-side relation with said longitudinal axes generally parallel to one another, said plurality of adaptor means linearly disposed along said longitudinal axis, each of said modules movable in a direction parallel to the longitudinal axis of each module.*

*24. A system according to claim 23 wherein each of said plurality of adaptor means is mountable to an SC fiber optic cable connector.*

*25. A signal transmission cable management system comprising:*

*a fixture; and*

*a plurality of modules mounted on said fixture with each of said modules movably mounted on said fixture for movement along a line of travel, each one of said modules including a plurality of adaptor means for holding a fiber optic connector, each adaptor means mountable to a fiber optic cable connector, each one of said adaptor means movable with said one of said modules along said line of travel, wherein said fixture includes a plurality of a spaced-apart walls, opposing pairs of said walls defining a plurality of channels, each of said modules being disposed within a respective channel, and further comprising cooperating guides on each of said modules and said walls for attaching said modules to said walls and accommodating movement of each of said modules along said line of travel.*

*26. A system according to claim 25 wherein each of said plurality of adaptor means is mountable to an SC fiber optic cable connector.*

*27. A signal transmission cable management system comprising:*

*a fixture;*

*a plurality of modules mounted on said fixture with each of said modules movably mounted on said fixture for movement along a line of travel, each one of said modules including a plurality of adaptor means for holding a fiber optic connector, each adaptor means for connecting first and second fiber optic cable connectors, each one of said adaptor means movable with said one of said modules along said line of travel, said plurality of adaptor means linearly disposed along said line of travel for each of said modules; and*

*a hinged locking tab at an end of each module for selectively locking each module to said fixture.*

*28. In a signal transmission cable management system having a fixture including a plurality of spaced apart walls defining a plurality of parallel spaced apart cavities, said walls including first and second parallel and opposing recesses; a module for mounting in said cavities, said module comprising:*

*a body sized to be slidably received within said cavity for movement along a line of travel, said body having first and second parallel rails, said rails sized to be slidably received within said recesses; and*

*said body including a plurality of adaptor means for connecting a plurality of fiber optic cables to said body, said plurality of adaptor means linearly aligned along said line of travel.*

*29. A module according to claim 28 wherein each of said plurality of adaptor means couples first and second SC fiber optic cable connectors.*

*30. A module according to claim 28 comprising a latch for securing said body to said fixture in a first position.*

* * * * *

UNITED STATES PATENT AND TRADEMARK OFFICE

CERTIFICATE OF CORRECTION

PATENT NO. : RE 38,311 E
APPLICATION NO. : 09/035377
DATED : November 11, 2003
INVENTOR(S) : Wheeler It is certified that error appears in the above-identified patent and that said Letters Patent is hereby corrected as shown below:

Col. 11, line 32, claim 25: "plurality of a spaced-apart walls," should read --plurality of spaced-apart walls,--

Signed and Sealed this

Seventeenth Day of July, 2007

JON W. DUDAS
*Director of the United States Patent and Trademark Office*

UNITED STATES PATENT AND TRADEMARK OFFICE

CERTIFICATE OF CORRECTION

PATENT NO. : RE38,311 E
APPLICATION NO. : 09/035377
DATED : November 11, 2003
INVENTOR(S) : Wheeler It is certified that error appears in the above-identified patent and that said Letters Patent is hereby corrected as shown below:

Col. 1, line 3: insert the following paragraph:

--Notice: More than one reissue application has been filed for the reissue of U.S. Patent No. 5,497,444. The reissue patent applications include the present reissue application Serial No. 09/035,377, filed March 5, 1998, now U.S. Patent RE 38,311; and reissue application Serial No. 10/391,052, filed March 18, 2003. Reissue application Serial No. 10/391,052 is a continuation reissue application of application Serial No. 09/035,377.--

Signed and Sealed this
Eighth Day of March, 2011

David J. Kappos

David J. Kappos
*Director of the United States Patent and Trademark Office*

UNITED STATES PATENT AND TRADEMARK OFFICE

CERTIFICATE OF CORRECTION

PATENT NO. : RE38,311 E
APPLICATION NO. : 09/035377
DATED : November 11, 2003
INVENTOR(S) : Todd A. Wheeler It is certified that error appears in the above-identified patent and that said Letters Patent is hereby corrected as shown below:

Column 1, lines 11-18, below the heading, "CROSS-REFERENCE TO RELATED APPLICATIONS", should read: --Notice: More than one reissue application has been filed for the reissue of patent 5,497,444. The reissue applications are application nos. 12/930,087, which is a continuation of 12/804,078, which is a continuation of 10/391,052, now Patent No. RE41,460, which is a continuation of 09/035,377, now Patent No. RE38,311, all of which are reissue applications of Patent No. 5,497,444.--

Signed and Sealed this
Ninth Day of October, 2012

David J. Kappos

David J. Kappos
*Director of the United States Patent and Trademark Office*